(12) United States Patent
Liu et al.

(10) Patent No.: US 6,704,814 B2
(45) Date of Patent: Mar. 9, 2004

(54) PORTABLE CD PLAYER AND BURNER

(75) Inventors: Wen-Tsung Liu, Hsin Tien (TW);
Mi-Chang Chen, Hsin Tien (TW);
Chia-Li Chen, Hsin Tien (TW)

(73) Assignee: Carry Computer Eng. Co., Ltd., Taipei (TW)

( * ) Notice: Subject to any disclaimer, the term of this patent is extended or adjusted under 35 U.S.C. 154(b) by 90 days.

(21) Appl. No.: 10/179,253

(22) Filed: Jun. 26, 2002

(65) Prior Publication Data
US 2003/0105898 A1 Jun. 5, 2003

(30) Foreign Application Priority Data
Dec. 5, 2001 (TW) ........................................ 90221188 U

(51) Int. Cl.[7] .............................................. G06F 13/12
(52) U.S. Cl. .............................. 710/62; 710/15; 710/73; 712/225; 711/100
(58) Field of Search .......................... 710/1, 7, 15, 18, 710/31, 62, 63, 64, 69, 73; 712/225; 709/201; 711/100

(56) References Cited
U.S. PATENT DOCUMENTS 5,526,331 A * 6/1996 Park et al. .................. 369/47
5,850,230 A * 12/1998 San et al. .................... 345/501
6,064,385 A * 5/2000 Sturgeon et al. ............ 345/353
6,137,469 A * 10/2000 Wu et al. .................... 345/131
6,359,987 B1 * 3/2002 Tran et al. ..................... 381/58
6,363,204 B1 * 3/2002 Johnson et al. ............... 386/46

* cited by examiner

Primary Examiner—Rehana Perveen
Assistant Examiner—RiJue Mai
(74) Attorney, Agent, or Firm—Bacon & Thomas, PLLC

(57) ABSTRACT

The portable CD player and burner is provided for integrating a CD-ROM player and a video/acoustic player used respectively on two different systems including a computer and a video/acoustic household electric appliance at the terminal of a device. The portable CD player and burner mainly is comprised of a housing, a CD reading/writing unit, an operating unit, a main board, a multiplexer, a CPU, a memory unit, a signal converting unit and at least an output/input unit. When a CD is placed in, signals can be transmitted to the systems of the computer or the video/acoustic household electric appliance, or the data of the computer can be transmitted to the CD reading/writing unit by using the above stated elements for outputting and inputting respectively.

7 Claims, 4 Drawing Sheets

PORTABLE CD PLAYER AND BURNER

BACKGROUND OF THE INVENTION

1. Field of the Invention

The present invention is related to a portable CD player and burner, and especially to a CD player and burner for integrating a CD-ROM player (such as a CD-RW, a DVD-ROM etc.) of a computer system and a video/acoustic players (such as a DVD player, a CD player etc.) used for a video/acoustic household electric appliance system, to thereby adequately satisfy multiple requirements of customers for playing CDs, reading data and making spares on CDs (such as VCDs, DVDs, general CDs and CDs stored with formats of software files to be burned and blank CDs to be burned etc.).

2. Description of the Prior Art

Following progressing of the multimedia and photologic storing techniques, the tendency of using various video/acoustic information on CDs is speeded up, for example, the VCDs used for recording the data formats of MPEG1, the DVDs used for recording the data formats of MPEG2 and the CD–DAs for recording the general music formats etc. Such CDs are used in large amount to store media of various video/acoustic programs such as movies, television, operas, music concerts and phonograph records etc. The devices in corresponding to these CD-ROMs are those players connectable with a television set, a projector and a speaker etc., for example, the application devices such as a DVD player, a VCD player, a CD player and a CD walkman etc.

On the other hand, by the features that a CD has large capacity and safe data preserving capability, it is especially suitable for storing of data spares, thereby, the field of the computer art takes a grave view of the speed of access and the burning and copying techniques of CDs. Nowadays, CD-ROM players have long been a standard equipment of a personal computer, it can principally be divided into two kinds: the read only CD-ROM players (such as CD-ROM, DVD-ROM) and the writable CD-ROM players (such as CD–RWs, DVD–RWs, DVD+RWs).

The above mentioned two kinds of CD-ROM players are both peripheral equipments (drivers) rather than application devices; the difference between the drivers and the devices is that, the application devices are independent in operating, while the peripheral equipments (drivers) can perform their functions only under the back-up of a host. For example, a DVD–RW is a peripheral equipment of a computer, it can not perform decoding and outputting functions of the image data in a CD, it can not show the dynamic images on the screen of the computer unless relies upon the back-up of the CPU and the video displaying card on the main board of the computer. While a DVD player can independently perform decoding function for the image data in a CD, and then outputs the data through an AV jack etc. to achieve the object of enjoying movies.

However, in the case that CDs are so widely used nowadays, customers always need to deal with CDs of different formats (such as VCDs, DVDs, general music CDs and CDs to be burned etc.), they have the double requirement of playing and data storing (generally called as "burning and recording"). It is an important key of thought to provided a brand-new CD application device convenient for carrying and capable of both playing and storing data, a customer can freely use such an application device in pursuance of the practical state of use and environment to obtain the functions of playing, reading and making spares of data (burning) etc.

SUMMARY OF THE INVENTION

In view of the practical requirements in use of the customer, the inventor of the present invention provides the portable CD player and burner of the present invention based on his experience of years in studying and developing and manufacturing peripheral equipments and digital video and acoustic devices and after continuous study and tests.

In particular, the portable CD player and burner of the present invention mainly is comprised of a housing, a CD reading/writing unit, an operating unit, a main board, a multiplexer, a CPU, a memory unit, a signal converting unit and at least an output/input unit. The CD placed in the CD reading/writing unit can be switched for changing path by the multiplexer, and is proceeded to encode and decode data through the CPU, the memory unit and the signal converting unit after the operating unit gives a command, then the signals are transmitted to a computer system or a video/acoustic household electric appliance system through the signal converting unit and the output/input unit, or the data of the computer system are transmitted to CD reading/writing unit for inputting to solve the problem that a conventional CD-ROM player or CD player is unable to be simultaneously used for the two different systems—a computer and a video/acoustic household electric appliance.

The primary object of the present invention is to provide a portable CD player and burner that can support playing and burning of all multimedia video/acoustic CDs, CDs stored with formats of software files to be burned and blank CDs to be burned etc., and can combine an input/output unit with a computer, a television set, a projector, a speaker or a personal computer for signal playing, reading and making data spares etc. to get an object of multipurpose and convenience of use.

Another object of the present invention is to use the present invention for integrating a CD-ROM player and a video/acoustic player used respectively on two different systems including a computer and a video/acoustic household electric appliance at the terminal of a device, this can satisfy the requirements for playing of CD-ROM players, reading data and making data spares etc. of various customer groups to largely reduce expanses of the customers in using CD-ROM outfits. For the customers using computer systems frequently, they do not have the necessity of considering the problem whether the supports of their computers are sufficient or whether upgrading is required; and the expenditure of purchasing video/acoustic household electric appliance systems and CD-ROM playing outfits can be saved.

The present invention will be apparent after reading the detailed description of the preferred embodiment thereof in reference to the accompanying drawings.

DETAILED DESCRIPTION OF THE PREFERRED EMBODIMENT

Figure 1:
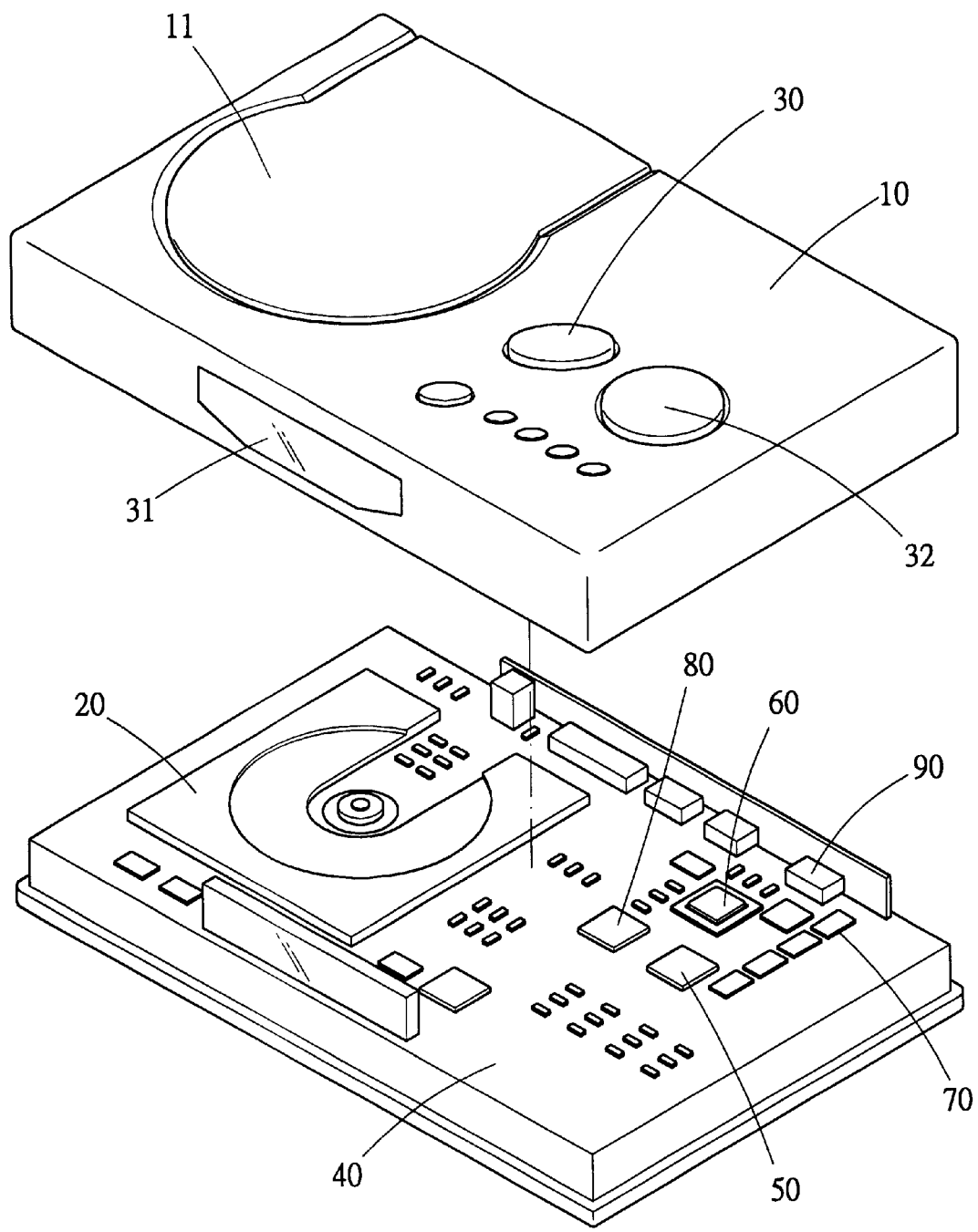
FIG. 1 is an analytic perspective view of the present invention.
Figure 2:
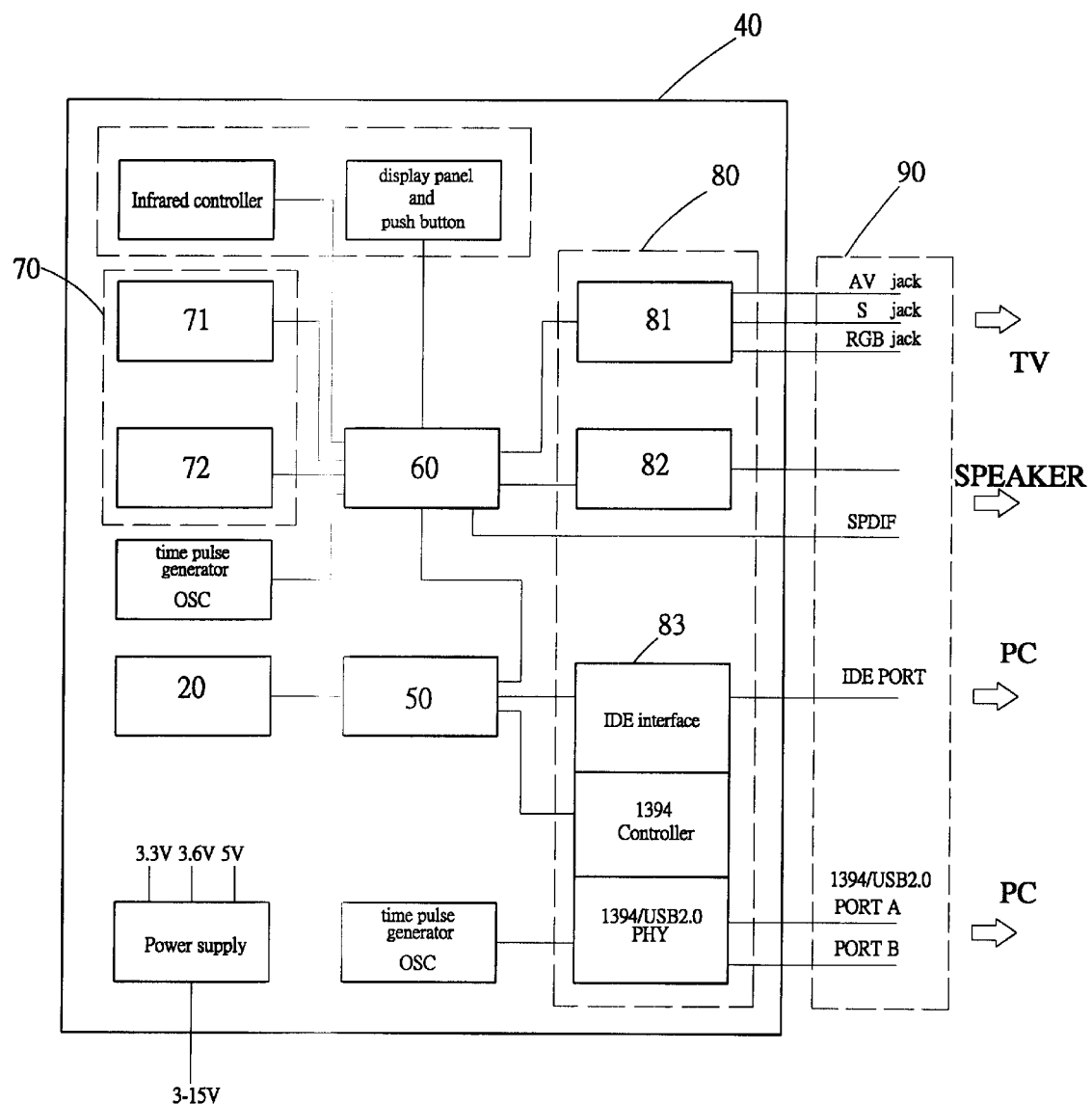
FIG. 2 is an electric block diagram of the present invention.

Referring firstly to FIGS. 1 and 2, the portable CD player and burner of the present invention is comprised mainly a housing 10 with an entrance 11, a CD reading/writing unit 20, an operating unit 30, a main board 40, a multiplexer 50, a CPU 60, a memory unit 70, a signal converting unit 80 and at least an output/input unit 90.

Wherein the housing 10 is same as a normal CD-ROM player in appearance, and is provided with an entrance 11 in favor of independent operation.

The CD reading/writing unit 20 is mounted in the housing 10 at a location in corresponding to that of the entrance 11, it can receive therein a CD of the standard specification of the size 12 cm or 8 cm, and can be of the specification of a super thin DVD+CDRW CD-ROM player using IDE/ATAPI as its transmission interface, so that the entire volume of it can be small, thereby it is light, thin and small favorable to carrying.

The operating unit 30 includes a display panel 31 and a push button 32 provided on the housing 10; an infrared remote controller can be added therein in favor of operation of a user to cooperate with playing of a video/acoustic CD on a household electric appliance system.

The main board 40 is placed in the housing 10 for providing thereon electronic elements and the elements in electrical connecting with the above stated units.

The multiplexer 50 is used mainly to switch among the bridging paths for distribution of data signals passively, so that the data read by the CD reading/writing unit 20 and the command transmitted from the operating unit 30 can be transmitted to other suitable units for processing through the multiplexer 50. And in practice, it is preferred to use a 3–1 multiplexer.

The CPU 60 is used to actively distribute and transmit data signals to all the units after it receives the command; in this way, the command is executed.

The memory unit 70 includes a dynamic random access memory (SDRAM) 71 and a program storage memory (EPROM) 72 for providing program software and to support the CPU 60 to process the encoded and decoded codes of the formats of digital signals (MPEG1, MPEG2, JPEG, WMA, MP3 and AAC etc.).

The signal converting unit 80 includes a TV encoder 81, a digital/analog converter 82 and a computer signal controller 83. The digital signals read by the above stated CD reading/writing unit 20 are processed by the main board 40, the multiplexer 50, the CPU 60 and the memory unit 70 and are transmitted to the signal converting unit 80 to be converted into suitable output signals. In which the computer signal controller 83 at least includes an IDE interface, a 1394 interface and a USB2.0 interface.

Figure 3:
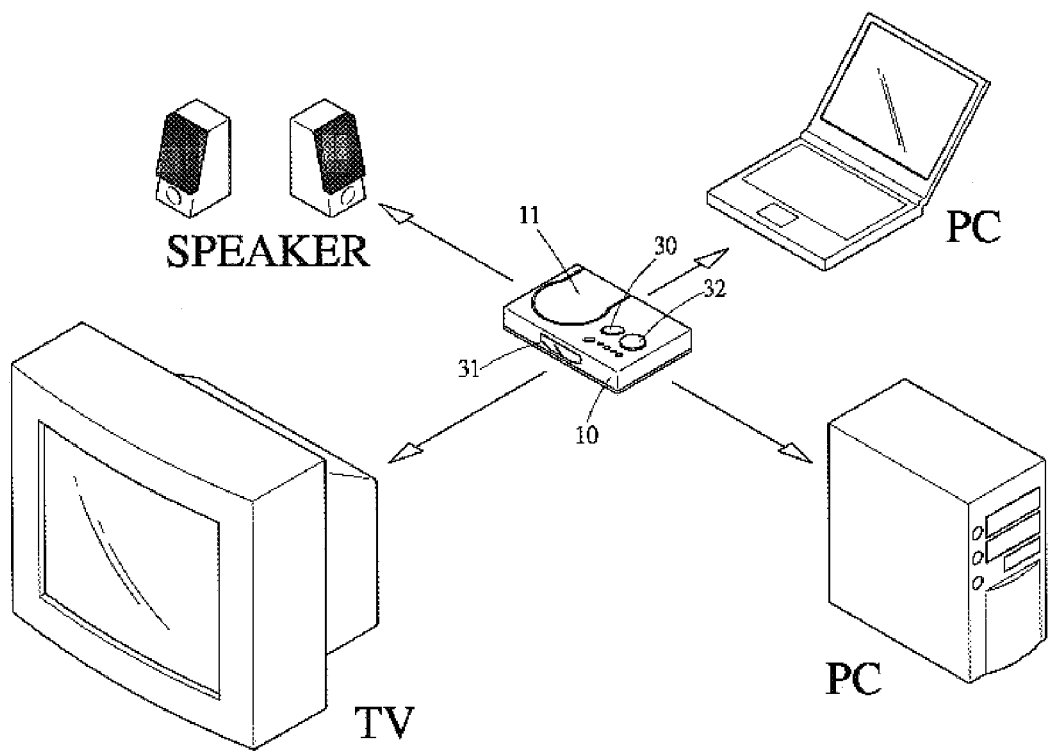
FIG. 3 is a schematic perspective view showing application of the present invention.

The output/input unit 90 can be connected between the signal converting unit 80 and a computer system (PC) and/or a video/acoustic household electric appliance system (speaker or TV as shown in FIG. 3); it includes the communication ports of a 1394 (PORT A), a USB2.0 (PORT B) and an IDE (IDE PORT) etc. connectable to the computer system; and includes an AV jack, an "s" jack, an RGB jack, a speaker, an earphone, a microphone jack and a fiber optic jack (able to back up SPDIF digital sound signals) connectable to a video/acoustic household electric appliance system. (Note: the SPDIF fiber optic jack is a newly added sound signal (AUDIO ONLY) transmitting unit capable of outputting digital sound signals restored by the CPU via the SPDIF jack to an amplifier and then to a speaker).

The CD player and burner combined from the above stated units can integrate a CD-ROM player of a computer system and a video/acoustic player used for a video/acoustic household electric appliance system to thereby adequately satisfy multiple requirements of customers for playing CDs, data reading and making spares with CDs.

Figure 4:
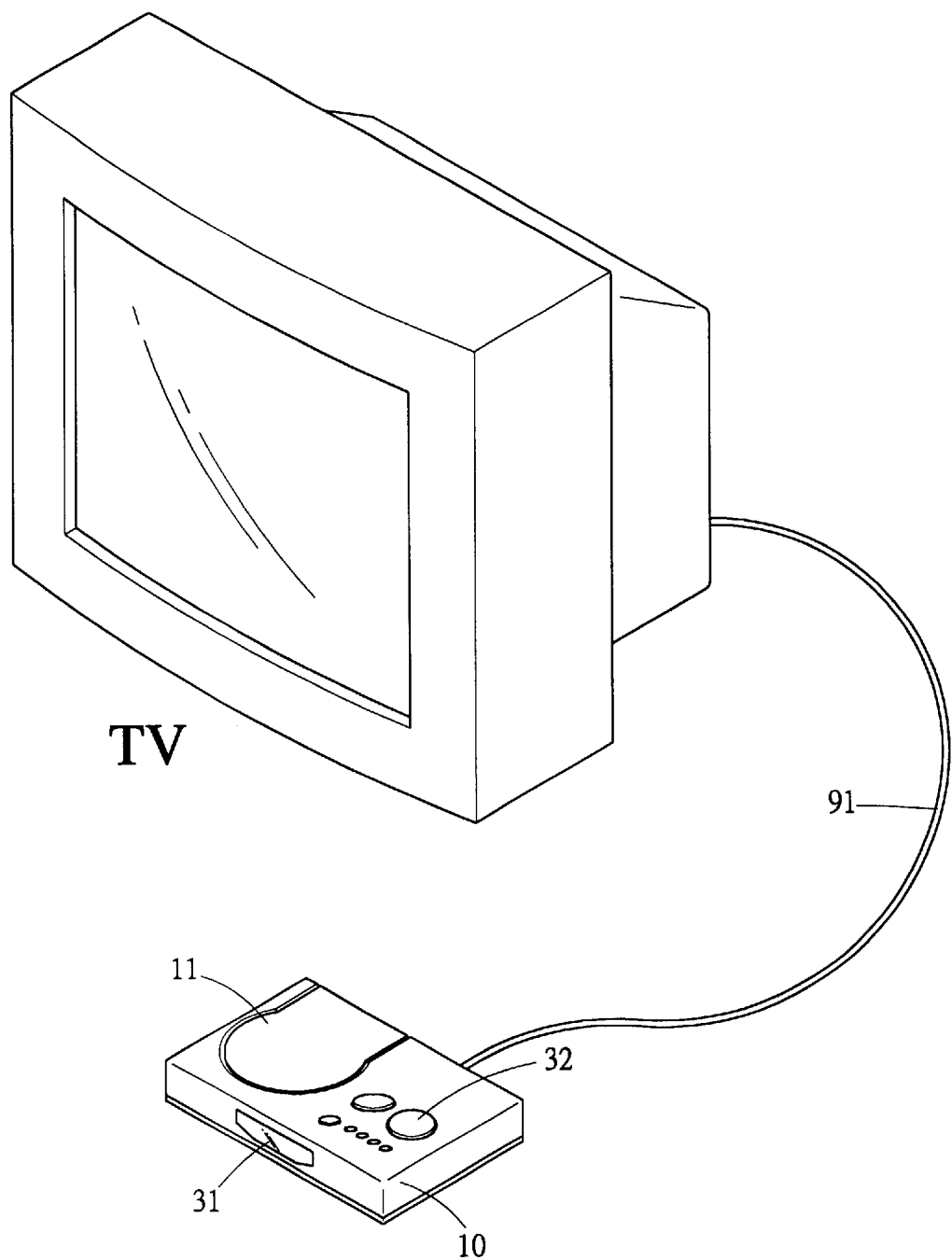
FIG. 4 is a schematic perspective view showing connection of the present invention with a video/acoustic system.

The followings are the explanations of the flow process of the units of the present invention during connecting of the video/acoustic household electric appliance system with the computer system:

As shown in FIGS. 2–4, when the CD-ROM player of the present invention is connected with a normal video/acoustic household electric appliance system (such as a TV or a speaker etc.), the user place a CD such as a musical CD, a VCD or a DVD into the entrance 11 of the housing 10, and can make a command by using the display panel 31 and the push button 32 of the operating unit 30 to render the multiplexer 50 to switch for changing path to the CD-ROM playing mode. When the signals in the CD are transmitted to the CPU 60, the corresponding program in the memory unit 70 reads the signals, and the read signals are divided into two parts, the video and the acoustic.

Wherein the part of images of the VCD or DVD is sent to the TV encoder 81 of the signal converting unit 80, and is output to the TV screen through the AV jack, the "s" jack, the RGB jack etc. of the output/input unit 90 in corresponding to various frames to be displayed on the TV screen. The part of sound on the VCD or DVD is output to the digital/analog converter 82 of the signal converting unit 80 to be converted into analog signals, and are output to a speaker of the TV or an earphone or a speaker of a hifi-set through the output/input unit 90.

If the CD in the CD reading/writing unit 20 is a music disk CD-DA, it is not necessary to use the TV encoder 81, the signals are directly converted into analog signals through the digital/analog converter 82 of the signal converting unit 80, and are directly output to the earphone or the speaker through a corresponding sound jack of the output/input unit 90; or the digital sound signals restored by the CPU are output via the SPDIF jack to an amplifier and then to the speaker.

As shown in FIGS. 2 and 3, when the CD player of the present invention is combined with a computer system (PC), it is connected with the computer system mainly by the communication ports including the 1394 (PORT A), the USB2.0 (PORT B) and the IDE (IDE PORT) etc.; and it is divided into two kinds as to the state of use: the data reading work on the CD stored with the formats of software files, and the burning work of the recorded spare data on the burned CD.

When the user wants to read the data in the CD, the CD stored with the formats of software files is placed into the entrance 11 of the housing 10, and a command is made by using the operating unit 30 to render the multiplexer 50 to switch for changing path to the computer system mode, the data in the CD are directly output to the computer through the computer signal controller 83 of the signal converting unit 80 and the communication port 1394 (PORT A), the USB2.0 (PORT B) or the IDE (IDE PORT) etc. of the output/input unit 90. Then the signals are converted to acceptable codes by the computer system (such as digital signals) taking advantage of the CPU, the display card and other elements provided in the computer system itself, the converted signals are output to the screen of the computer or the "file manager", thereby, the user can view or open the data files in the CD.

When it is to make a data spare on the CD (burned CD) from the computer system, during burning, the CD is placed into the CD reading/writing unit 20 through the housing 10, a command of burning is given by the operating unit 30 to render the multiplexer 50 to switch for changing path to the burning mode, thereby the computer signal controller 83 of the signal converting unit 80 and the communication port 1394 (PORT A), the USB2.0 (PORT B) or the IDE (IDE PORT) etc. of the output/input unit 90 can be connected with the computer system. Hence the data of the computer system can be transmitted to the CD reading/writing unit 20 through the output/input unit 90 and the signal converting unit 80; and the CD reading/writing unit 20 performs the recording and making spare on the CD.

In conclusion, the portable CD player and burner of the present invention having the brand-new space combination from the above stated units can back up playing and burning of all the multimedia video/acoustic CDs of the standard CD specifications, stored with formats of software files to be burned and blank CDs to be burned etc.; and can take advantage of combination of different output/input units with various systems such as a computer, a TV, a projector, a speaker or a personal computer etc. for playing, reading, making data spare etc. in favor of random using of customers in pursuance of the practical condition of use and environment.

What is claimed is:

1. A portable CD player and burner comprising:

a housing with an entrance in favor of independent operation and for placing therein a CD;

a CD reading/writing unit mounted in said housing at a location in corresponding to that of said entrance;

an operating unit including a display panel and a push button provided on said housing;

a main board placed in said housing for providing thereon electronic elements and the elements in electrical connecting with all units of said CD player and burner;

a multiplexer used to switch among the bridging paths for distribution of data signals passively, in order that the data read by said CD reading/writing unit and the command transmitted from said operating unit are transmitted to the remaining of said units of said CD player and burner for processing through said multiplexer;

a CPU used to actively distribute and transmit data signals to all said units after receiving said command from said operating unit;

a memory unit for providing program software and to support said CPU to process encoded and decoded codes of the formats of digital signals;

a signal converting unit including a TV encoder, a digital/analog converter and a computer signal controller; said digital signals read by said CD reading/writing unit are processed by said main board, said multiplexer, said CPU and said memory unit and are transmitted to said signal converting unit to be converted into output signals; and at least an output/input unit connected between said signal converting unit and a computer system and/or a video/acoustic household electric appliance system, said output/input unit includes communication ports connectable to a computer system, and an output jack connectable to a video/acoustic household electric appliance system;

a CD placed in said CD reading/writing unit is given a command from said operating unit to render said multiplexer to switch for changing path, thereby to encode and decode data through said CPU, said memory unit and said signal converting unit, then signals are transmitted to a computer system or a video/acoustic household electric appliance system via said signal converting unit and said output/input unit, or the data of said computer system are transmitted to said CD reading/writing unit for inputting, thereby functions of playing a CD, reading data and making a data spare are obtained.

2. The portable CD player and burner as in claim 1, wherein
   said CD reading/writing unit is of the specification of a super thin DVD+CDRW CD-ROM player using IDE/ATAPI as its transmission interface, and is adapted to receiving therein a CD of one of the standard specifications of 12 cm and 8 cm.

3. The portable CD player and burner as in claim 1, wherein said operating unit includes an infrared remote controller.

4. The portable CD player and burner as in claim 1, wherein said multiplexer is a 3–1 multiplexer.

5. The portable CD player and burner as in claim 1, wherein said memory unit includes a dynamic random access memory and a program storage memory.

6. The portable CD player and burner as in claim 1, wherein said computer signal controller of said signal converting unit at least includes an IDE interface, a 1394 interface and a USB2.0 interface.

7. The portable CD player and burner as in claim 1, wherein
   said output/input unit includes the communication ports of a 1394, a USB2.0 and an IDE connectable to said computer system; and an AV jack, an "s" jack, an RGB jack, a speaker, an earphone, a microphone jack and a fiber optic jack for SPDIF digital sound signals connectable to said video/acoustic household electric appliance system.

* * * * *